United States Patent
Polinsky et al.

[15] 3,655,337
[45] Apr. 11, 1972

[54] PROCESS FOR DESULFATION OF ALKALINE SOLUTIONS

[72] Inventors: Samuel M. Polinsky, Salt Lake City, Utah; Alfred K. Schellinger, White Plains, N.Y.

[73] Assignee: Kennecott Copper Corporation, New York, N.Y.

[22] Filed: May 16, 1969

[21] Appl. No.: 825,388

[52] U.S. Cl. .................................. 23/122, 23/52, 23/143
[51] Int. Cl. ............................... C01f 11/46, C01f 7/02
[58] Field of Search .......................... 23/122, 52, 143

[56] References Cited

UNITED STATES PATENTS 737,740   9/1903   Jacobs ........................... 23/122 X
1,191,106 2/1916   Hershman ........................ 23/143
2,504,154 4/1950   Roller ............................ 23/52

Primary Examiner—Oscar R. Vertiz
Assistant Examiner—Gregory A. Heller
Attorney—John L. Sniado, Mallinckrodt & Mallinckrodt, P. H. Mallinckrodt, Philip A. Mallinckrodt and Kay S. Cornaby

[57] ABSTRACT

A process for removing sulfates from alkaline solutions using barium hydroxide which is solubilized by heating a mixture of barium hydroxide and water. The barium hydroxide solution is then added to the alkaline solution containing sulfate ions, from which barium sulfate precipitates. Substantially all of the sulfate ions are precipitated with virtually no entrapment of other valuable ions. The barium sulfate can be regenerated to barium hydroxide by known means and recycled.

6 Claims, No Drawings

PROCESS FOR DESULFATION OF ALKALINE SOLUTIONS

BACKGROUND OF THE INVENTION

1. Field

The invention relates to a process for removing sulfate ions from an alkaline medium.

2. State of the Art

In the processing of alunite or bauxite ores to obtain alumina, a number of impurities found in the ores, such as sulfate and carbonates, are required to be removed in order to achieve a high degree of separation of the aluminates from the ore. The separation process most commonly used in the U.S. is the Bayer process, which includes an alkaline digestion of aluminous ores, usually under pressure, to solubilize the alumina values contained therein. The residues are then separated from the digestion phase, and alumina precipitates from the pregnant liquor as hydrated alumina. The separated insoluble residues can be washed with water to recover alumina values associated therewith. After separation of the hydrate alumina, the clarified spent liquors are concentrated and recycled for further extraction in the digestive phase.

Efforts to reduce or eliminate the sulfate concentration in the digestive liquor have been hampered by the alkalinity of the digestive medium. Attempts to precipitate the sulfate using calcium chloride have been unsuccessful for two reasons. The calcium does not precipitate the entire quantity of sulfate present in solution, and undesirable chloride ions are introduced into the solution. Other attempts using barium carbonate as the precipitating agent have produced equally undesirable results, since the carbonate ion is substituted for the sulfate ion, which results in an increase in the concentration of undesirable carbonate ions.

U.S. Pat. No. 2,504,154 discloses the use of barium aluminate as a precipitant for sulfate ions in an alkaline medium. However, barium aluminate is only very slightly soluble and must therefore be employed in the form of a suspension requiring 18 to 22 hours to precipitate relatively minor amounts of sulfate ion, e.g., 13 to 23 percent.

OBJECTIVES

The process of the invention provides for the complete precipitation of sulfate ions in alkaline solutions using barium hydroxide. The process is particularly advantageous for the removal of sulfate ions in the Bayer process for separating alumina values from aluminum-bearing ores.

SUMMARY OF THE INVENTION

In practicing the invention, barium hydroxide is solubilized by heating in water to form an aqueous solution. The barium hydroxide solution is then added to an alkaline medium containing sulfate ions. Barium sulfate precipitates as a solid and can be removed from the solution by filtration or other appropriate means.

DETAILED DESCRIPTION OF THE BEST MODE CONTEMPLATED

The addition of dry barium hydroxide to the caustic liquor in an alumina extraction process results in virtually no precipitation of barium sulfate. The barium hydroxide tends to filter through the liquor and collect at the bottom of the container. This is not unexpected, since it is known that a basic salt such as barium hydroxide, will not become soluble in an alkaline solution. It has been found necessary to first solubilize the barium hydroxide by heating a quantity of barium hydroxide in water until it dissolves.

In the next step of the process, the hot barium hydroxide solution is introduced into the caustic liquor. It has been found advantageous to add the barium hydroxide solution to the liquor prior to the digestive step in the Bayer process. However, it is possible to add the solution during, or following, the digestive step. Under some circumstances it may be preferable to precipitate the sulfate ions at a point before or following the precipitation of the aluminate ions from the pregnant liquor.

Following the addition of the barium hydroxide solution, the barium sulfate precipitates from the solution and may be separated and removed by filtration, centrifugation or other appropriate means. The barium sulfate is collected and can be regenerated into a soluble barium hydroxide by carbon reduction treatment of the sulfate, followed by leach extractions and concentration of the resulting barium hydroxide salts. The resulting barium hydroxide salts can then be recycled through the process.

It is noteworthy that substantially all of the sodium sulfate in the caustic liquor can be removed by this process in a short period of time. It is of special significance that virtually no aluminate ions are entrapped and carried down with the precipitation barium sulfate, even though the concentration of aluminate ion can be rather high in the caustic liquor.

The following example illustrates the process of the invention, but does not in any way limit its scope.

EXAMPLE

A quantity of barium hydroxide ($Ba(OH)_2$) weighing 55 grams was dissolved by heating it in 1 l. of water at approximately 125° C. for 15 minutes. The hot $Ba(OH)_2$ solution was added with constant stirring to 1 liter of alumina liquor containing 30 g. sulfate, 37 g. aluminum and 128 g. sodium hydroxide. $BaSO_4$ precipitated within 3–15 minutes, and vacuum filtration was used to separate the alumina liquor and the $BaSO_4$ precipitate. The extraction of sulfate from the treated alumina liquors was 99 percent, with an aluminum loss of 0.7 percent.

We claim:

1. A process for rapidly removing sulfate ions from alkaline solutions containing sulfate values, comprising:
   preparing an aqueous barium hydroxide solution by solubilizing barium hydroxide in water;
   contacting an alkaline solution of the type specified with an effective amount of the barium hydroxide solution for a period of time sufficient to precipitate barium sulfate; and
   separating the barium sulfate precipitate from the alkaline solution.

2. A process as set forth in claim 1, wherein aluminum values are present in the alkaline solution.

3. A process as set forth in claim 2, wherein the alkaline solution is a sulfate-bearing, caustic, digestion liquor produced in the Bayer process for extracting aluminum values from alunite or bauxite ores.

4. A process as set forth in claim 1, wherein the barium sulfate precipitate is reduced with carbon and leached to regenerate barium hydroxide.

5. A process as set forth in claim 4, wherein the regenerated barium hydroxide is recycled as part of a cyclical process.

6. A process as set forth in claim 1, wherein the time necessary to precipitate the barium sulfate from the reaction mixture is less than about 15 minutes, using an amount of barium hydroxide at least stoichiometric with the amount of sulfate values to be removed.

* * * * *